United States Patent
Mondal et al.

(10) Patent No.: US 8,086,799 B2
(45) Date of Patent: Dec. 27, 2011

(54) SCALABLE DEDUPLICATION OF STORED DATA

(75) Inventors: Shishir Mondal, Bangalore (IN);
Praveen Killamsetti, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 806 days.

(21) Appl. No.: 12/190,511

(22) Filed: Aug. 12, 2008

(65) Prior Publication Data

US 2010/0042790 A1 Feb. 18, 2010

(51) Int. Cl.
*G06F 12/00* (2006.01)
(52) U.S. Cl. .......................... 711/116; 711/117
(58) Field of Classification Search .................... 711/161
See application file for complete search history.

(56) References Cited

U.S. PATENT DOCUMENTS

| | | | |
|---|---|---|---|
| 5,990,810 A | 11/1999 | Williams | |
| 2008/0005141 A1 | 1/2008 | Zheng et al. | |
| 2008/0005201 A1 | 1/2008 | Ting et al. | |
| 2008/0013830 A1 | 1/2008 | Patterson et al. | |
| 2009/0083563 A1* | 3/2009 | Murase | 713/324 |
| 2009/0083610 A1* | 3/2009 | Arai et al. | 714/807 |

OTHER PUBLICATIONS

International Search Report of PCT Application No. PCT/US2009/53433, Mar. 16, 2010, 3 pages.
Written Opinion of PCT Application No. PCT/US2009/53433, Mar. 16, 2010, 4 pages.

* cited by examiner

*Primary Examiner* — Tuan Thai
*Assistant Examiner* — Ngoc Dinh
(74) *Attorney, Agent, or Firm* — Perkins Coie LLP (57) ABSTRACT

In a method and apparatus for scalable deduplication, a data set is partitioned into multiple logical partitions, where each partition can be deduplicated independently. Each data block of the data set is assigned to exactly one partition, so that any two or more data blocks that are duplicates of each are always be assigned to the same logical partition. A hash algorithm generates a fingerprint of each data block in the volume, and the fingerprints are subsequently used to detect possible duplicate data blocks as part of deduplication. In addition, the fingerprints are used to ensure that duplicate data blocks are sent to the same logical partition, prior to deduplication. A portion of the fingerprint of each data block is used as a partition identifier to determine the partition to which the data block should be assigned. Once blocks are assigned to partitions, deduplication can be done on partitions independently.

20 Claims, 7 Drawing Sheets

SCALABLE DEDUPLICATION OF STORED DATA

FIELD OF THE INVENTION

At least one embodiment of the present invention pertains to data storage systems, and more particularly, to a technique for scalable deduplication of stored data.

BACKGROUND

A network storage controller is a processing system that is used to store and retrieve data on behalf of one or more hosts on a network. A storage controller operates on behalf of one or more hosts to store and manage data in a set of mass storage devices, such as magnetic or optical storage-based disks or tapes. Some storage controllers are designed to service file-level requests from hosts, as is commonly the case with file servers used in a network attached storage (NAS) environment. Other storage controllers are designed to service block-level requests from hosts, as with storage controllers used in a storage area network (SAN) environment. Still other storage controllers are capable of servicing both file-level requests and block-level requests, as is the case with certain storage controllers made by NetApp, Inc. of Sunnyvale, Calif.

In a large-scale storage system, such as an enterprise storage network, it is common for certain items of data, such as certain data blocks, to be stored in multiple places in the storage system, sometimes as an incidental result of normal operation of the system and other times due to intentional copying of data. For example, duplication of data blocks may occur when two or more files have some data in common or where a given set of data occurs at multiple places within a given file. Duplication can also occur if the storage system backs up data by creating and maintaining multiple persistent point-in-time images, or "snapshots", of stored data over a period of time. Data duplication generally is not desirable, since the storage of the same data in multiple places consumes extra storage space, which is a limited resource.

Consequently, in many large-scale storage systems, storage controllers have the ability to "deduplicate" data, which is the ability to identify and remove duplicate data blocks. In one known approach to deduplication, any extra (duplicate) copies of a given data block are deleted (or, more precisely, marked as free), and any references (e.g., pointers) to those duplicate blocks are modified to refer to the one remaining instance of that data block. A result of this process is that a given data block may end up being shared by two or more files (or other types of logical data containers).

A problem with at least one known deduplication technique is that it is not scalable. The deduplication technique uses a sorting algorithm. Because the amount of memory used for sorting is bounded, the time required for sorting (and, therefore, the time required to detect and eliminate duplicate data blocks) increases disproportionately (e.g., geometrically) with the size of the data set to be deduplicated.

Consequently, for very large data sets, deduplication can be extremely time consuming. Deduplication consumes processor and memory resources, and as such, it can adversely impact the performance of the storage system for purposes of servicing normal user requests. Therefore, it is desirable to spend as little time on deduplication as possible.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

A method and apparatus for scalable deduplication are introduced here. Briefly stated, a data set to be deduplicated is partitioned into multiple logical partitions, in such a way that each logical partition can be deduplicated independently. Consequently, the time required to deduplicate the entire set of data increases only additively as the size of data set increases, rather than disproportionately. To accomplish this, each data block of the set of data is assigned to exactly one logical partition, in such a way that any two or more data blocks that are duplicates of each other will always be assigned to the same logical partition. As a result, deduplication can be localized within individual logical partitions, and such deduplication can effectively identify and eliminate duplicates.

A hash algorithm is used to generate a fingerprint of each data block in the volume, and the fingerprints are subsequently used to detect duplicate data blocks as part of deduplication. By initially comparing only the fingerprints (which are much smaller than the actual data blocks), rather than doing byte-by-byte comparisons of all data blocks in their entirety, time is saved during duplicate detection (although byte-by-byte comparisons may still be done on blocks identified as possible duplicates).

In addition, in accordance with the technique introduced here, the fingerprints of the data blocks are also used to ensure that duplicate data blocks are sent to the same partition, prior to deduplication. In particular, a portion of the fingerprint value of each data block is used as a partition identifier, or tag, to determine the logical partition to which the data block should be assigned. Once blocks are assigned to logical partitions, deduplication can be done on partitions independently, at any time and in any convenient manner (e.g., by processing multiple partitions in parallel, or sequentially, or some combination thereof). Further, deduplication can be done in batch mode as an offline process. Based on the number of changed data blocks per logical partition (e.g., the number of blocks changed since the last deduplication operation was performed) or some other predefined event or time, deduplication can be scheduled to operate in a particular order to achieve the greatest benefit.

The used (allocated) part of a set of data, such as a volume, is represented by a collection of fingerprint records. It can be assumed that unused (free) data blocks are not considered in the process of detecting and eliminating duplicates; only used data blocks are considered. Any of various known hash algorithms with a good statistical distribution property (e.g., MD5, SHA-1, SHA-256 or SHA-512) can be used to generate the fingerprint of each data block. It is assumed that the hash algorithm used is such that each bit of the fingerprint value is equally dependent on the content of the data block, and each bit of the fingerprint value has the same probability of being a logical "1" as every other bit of the fingerprint value. Note that while this description assumes that the data set to be deduplicated is a volume to facilitate explanation, it is possible that the technique introduced here could be used to partition and deduplicate a different form of data set, such as a file, a directory, etc.

The fingerprints of the data blocks in a volume are stored in a fingerprint database, which is partitioned in a manner which represents a logical partitioning of the volume itself, in the form of a list of fingerprint records. Each fingerprint record includes a fingerprint value, the corresponding block's location, the time at which the block was last modified and other metadata that may be needed to perform deduplication. Each data block belongs to exactly one partition of a volume. In other words, since the fingerprint database is partitioned using fingerprint tags, if the fingerprints of two data blocks are same, then both data blocks' fingerprint records will fall into the same fingerprint database partition, and hence, both blocks will fall into the same (logical) partition of the volume. If, for example, a fingerprint belongs to fingerprint partition, $Pf_x$, where x is an identifier dependent on a portion of the fingerprint value, then the data block with the same fingerprint value corresponding to that fingerprint belongs to the corresponding volume partition, $Pv_x$.

A volume can be partitioned this way by using fingerprint values of the blocks it contains. For example, assume that it is desired to have $2^N$ logical partitions of a given volume. A fixed N designated bits of the fingerprint value, such as the N most significant bits (MSBs) of the fingerprint value, can be used as a partition identifier (ID), or tag, of both the fingerprint record and the corresponding data block. Note, however, that as long as each bit of the fingerprint value has the same probability of being a logical "1" as every other bit, any N bits of the fingerprint can be used for this purpose, such as the N least significant bits (LSBs) of the fingerprint or N bits in the middle of the fingerprint. A consequence of using a portion of the fingerprint value to assign fingerprint records and their corresponding data blocks to partitions is that data blocks with the same content will always be assigned to the same partition.

In at least some embodiments, the size of each volume partition is fixed. Hence, the number of physically different block contents a volume partition can accommodate is predetermined, based on the partition size. If the size of a volume changes, the number of partitions changes, but the size of each partition remains the same. Note, however, that in some embodiments, with a greater number of partitions there may also be greater overhead of metadata management (i.e., for partition management).

The size of the volume partitions can be chosen based on, for example, the expected amount of memory needed to perform deduplication on a partition of a given size and the expected amount of available memory at the time of deduplication: The larger each partition is, the more data there can be in each partition, and therefore, the more memory is generally required to perform deduplication on the partition.

Figure 1:
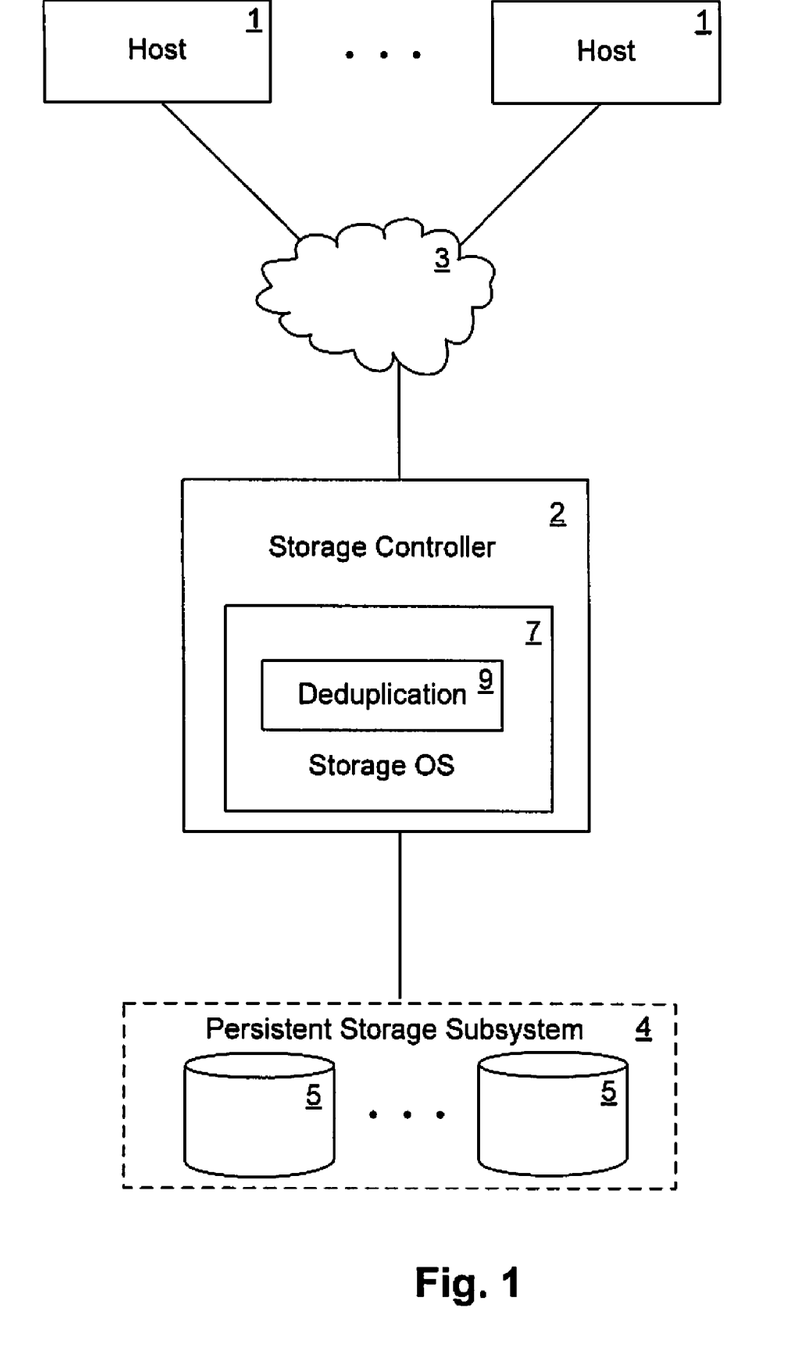
FIG. 1, which shows a network storage system in which the technique introduced here can be implemented.

Refer now to FIG. 1, which shows a network storage system in which the technique being introduced here can be implemented. In FIG. 1, a storage controller 2 is coupled to a storage subsystem 4 and to a set of hosts 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the hosts 1 may be, for example, a conventional personal computer (PC), server-class computer, workstation, handheld computing/communication device, or the like.

Storage of data in the storage subsystem 4 is managed by the storage controller 2. The storage controller 2 and the storage subsystem 4 are collectively referred to as the storage system. The storage controller 2 receives and responds to various read and write requests from the hosts 1, directed to data stored in or to be stored in storage subsystem 4. The storage subsystem 4 includes a number of nonvolatile mass storage devices 5, which can be, for example, conventional magnetic or optical disks or tape drives; alternatively, they can be non-volatile solid-state memory, such as flash memory, or any combination of such devices. The mass storage devices 5 in storage subsystem 4 can be organized as a Redundant Array of Inexpensive Disks (RAID), in which case the storage controller 2 can access the storage subsystem 4 using a conventional RAID algorithm for redundancy.

The storage controller 2 includes a storage operating system 7, which is responsible for managing storage of data in the source storage subsystem 4, servicing requests from hosts 1, and performing various other types of storage related operations. In the illustrated embodiment, the storage operating system 7 includes a deduplication subsystem 9 which performs deduplication of data blocks. In other embodiment, the deduplication subsystem 9 may be a separate component from the storage operating system 7. In certain embodiments, the storage operating system 7 and deduplication subsystem 9 are both implemented in the form of software (executed by one or more programmable processors). In other embodiments, however, either of both of these elements may be implemented in pure hardware, e.g., specially-designed dedicated circuitry, or as a combination of software and specially-designed dedicated circuitry.

The storage controller 2 can be, for example, a storage server which provides file-level data access services to hosts, such as commonly done in a NAS environment, or block-level data access services such as commonly done in a SAN environment, or it may be capable of providing both file-level and block-level data access services to hosts. Further, although the storage controller 2 is illustrated as a single unit in FIG. 1, it can have a distributed architecture. For example, the storage controller 2 can be designed as a physically separate network module (e.g., "N-blade") and disk module (e.g., "D-blade") (not shown), which communicate with each other over a physical interconnect. Such an architecture allows convenient scaling, such as by deploying two or more N-modules and D-modules, all capable of communicating with each other through the interconnect.

Figure 2:
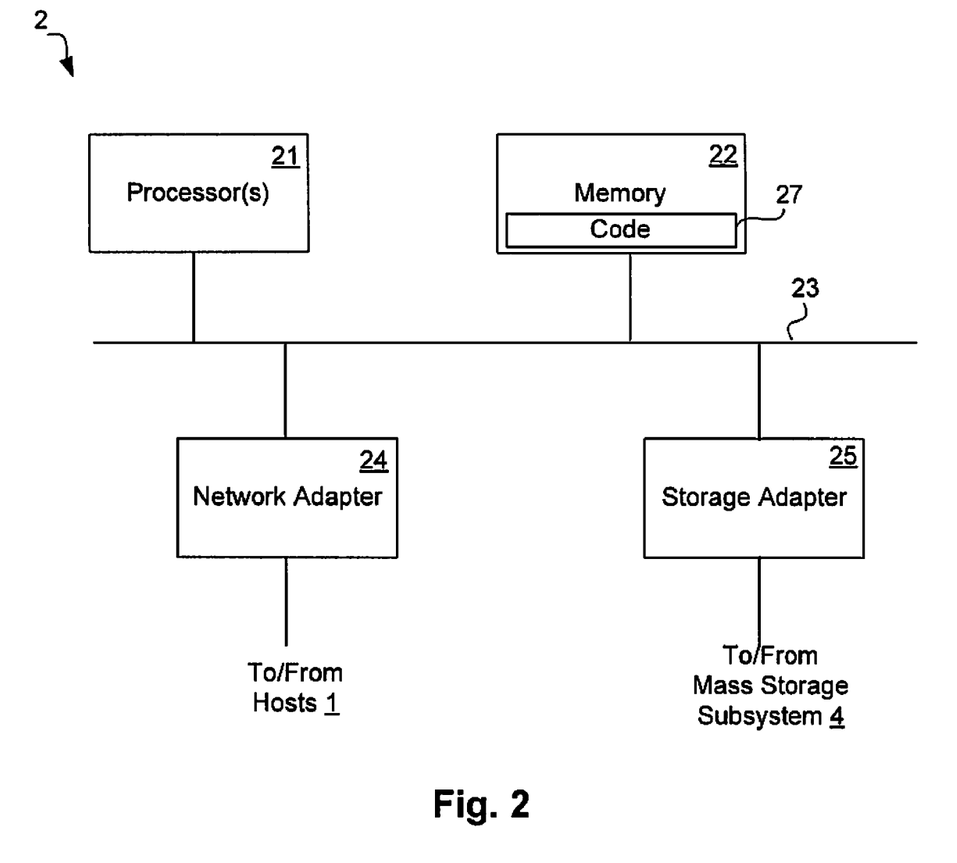
FIG. 2 is a high-level block diagram showing an example of the architecture of a storage system.

FIG. 2 is a high-level block diagram showing an example of the architecture of the storage controller 2. The storage controller 2 includes one or more processors 21 and memory 22 coupled to an interconnect 23. The interconnect 23 shown in FIG. 2 is an abstraction that represents any one or more separate physical buses, point-to-point connections, or both, connected by appropriate bridges, adapters, or controllers. The interconnect 23, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 21 is/are the central processing unit (CPU) of the storage controller 2 and, thus, control the overall operation of the storage controller 2. In certain embodiments, the processor(s) 21 accomplish this by executing software or firmware stored in memory 22. The processor(s) 21 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 22 is or includes the main memory of the storage controller 2. The memory 22 represents any form of random access memory (RAM), read-only memory (ROM), flash memory, or the like, or a combination of such devices. In use, the memory 22 may contain, among other things, code 27 embodying the storage operating system 7 and/or the deduplication subsystem 9.

Also connected to the processor(s) 21 through the interconnect 23 are a network adapter 24 and a storage adapter 25. The network adapter 24 provides the storage controller 2 with the ability to communicate with remote devices, such as hosts 1, over the interconnect 3 and may be, for example, an Ethernet adapter or Fibre Channel adapter. The storage adapter 25 allows the storage controller 2 to access the storage subsystem 4 and may be, for example, a Fibre Channel adapter or SCSI adapter.

Figure 3:
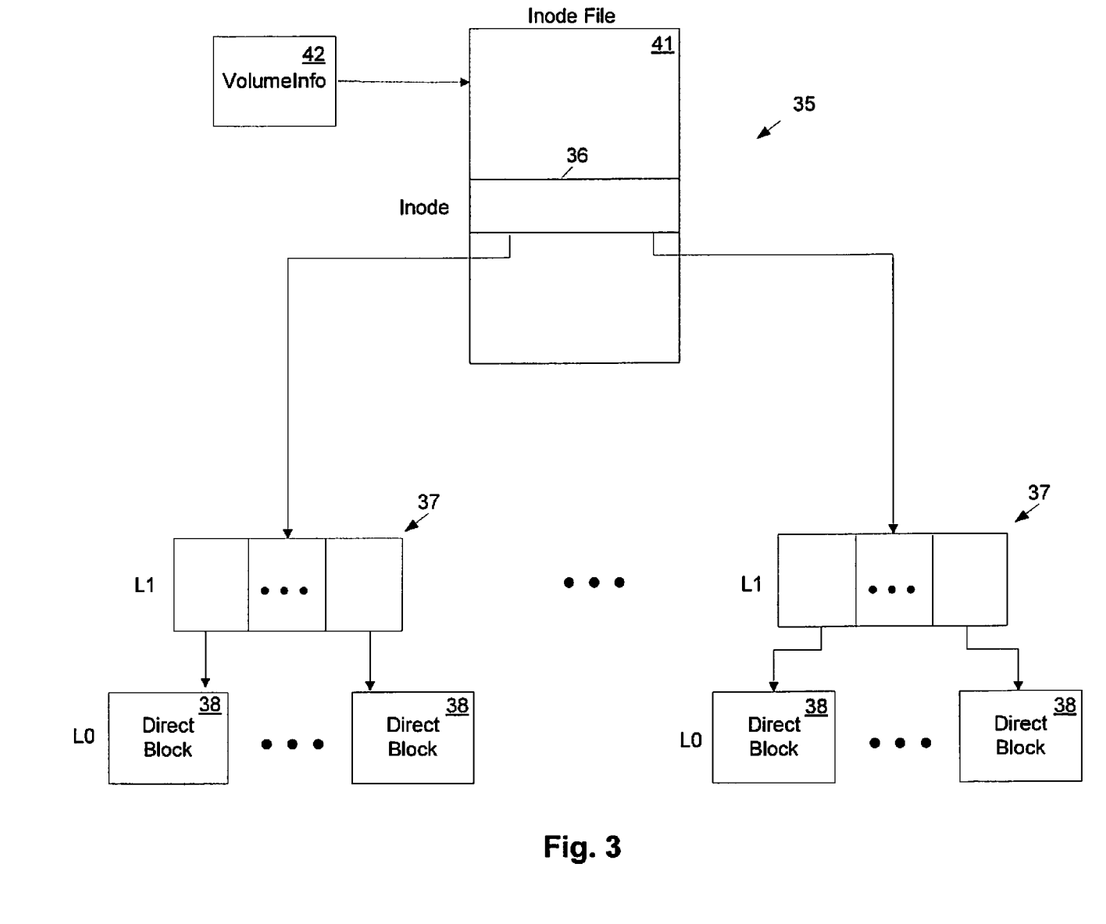
FIG. 3 shows an example of a buffer tree and the relationship between inodes, an inode file and the buffer tree.

It is useful now to consider how data can be structured and organized by the storage controller 2. Reference is now made to FIG. 3 in this regard. In at least one embodiment, data is stored in the form of volumes, where each volume contains one or more directories, subdirectories and/or files. The term "aggregate" is used to refer to a pool of storage, which combines one or more physical mass storage devices (e.g., disks) or parts thereof into a single logical storage object. An aggregate contains or provides storage for one or more other logical data sets at a higher level of abstraction, such as volumes. A "volume" is a set of stored data associated with a collection of mass storage devices, such as disks, which obtains its storage from (i.e., is contained within) an aggregate, and which is managed as an independent administrative unit, such as a complete file system. Each volume can contain data in the form of one or more directories, subdirectories and files.

In certain embodiments, each file is represented in a storage controller on the form of a hierarchical structure called a "buffer tree". A buffer tree is a hierarchical structure which used to store file data as well as metadata about a file, including pointers for use in locating the data blocks for the file. A buffer tree includes one or more levels of indirect blocks (called "L1 blocks", "L2 blocks", etc.), each of which contains one or more pointers to lower-level indirect blocks and/ or to the direct blocks (called "L0 blocks") of the file. All of the data in the file is stored only at the lowest level (L0) blocks.

The root of a buffer tree is the "inode" of the file. An inode is a metadata container that is used to store metadata about the file, such as ownership, access permissions, file size, file type, and pointers to the highest level of indirect blocks for the file. Each file has its own inode. The inode is stored in a separate inode file, which may itself be structured as a buffer tree.

FIG. 3 shows an example of a buffer tree 35 for a file. The file is assigned an inode 36, which references Level 1 (L1) indirect blocks 37. Each indirect block 37 stores two or more pointers to a lower-level block, e.g., a direct block 38. Each pointer in an L1 and indirect block 37 references a physical block 38 in a storage device (i.e., in the aggregate 30).

For each volume managed by the storage server 2, the inodes of the files and directories in that volume are stored in a separate inode file, such as inode file 41 in FIG. 3 which stores inode 36. A separate inode file is maintained for each volume. The location of the inode file for each volume is stored in a Volume Information ("VolumeInfo") block associated with that volume, such as VolumeInfo block 42 in FIG. 3. The VolumeInfo block 42 is a metadata container that contains metadata that applies to the volume as a whole. Examples of such metadata include, for example, the volume's name, type, size, any space guarantees to apply to the volume, and a pointer to the location of the inode file of the volume.

Figure 4A:
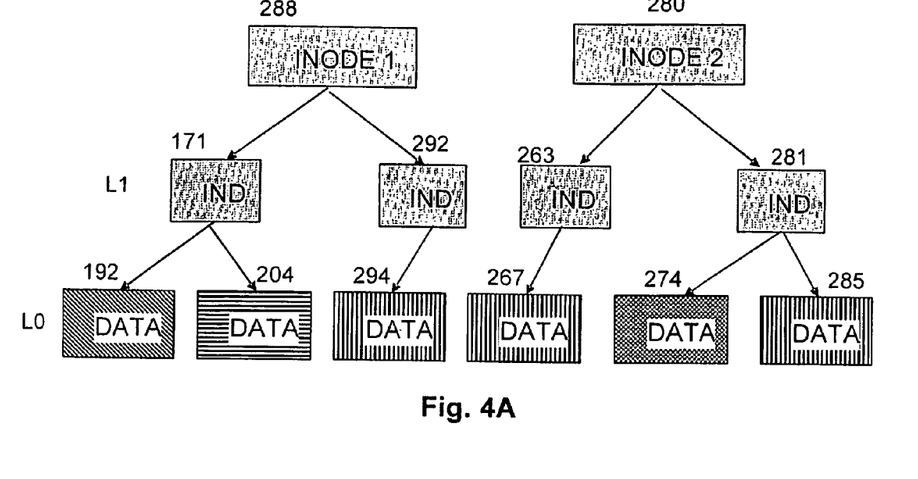
FIGS. 4A and 4B illustrate an example of two buffer trees before and after deduplication of data blocks, respectively.
Figure 4B:
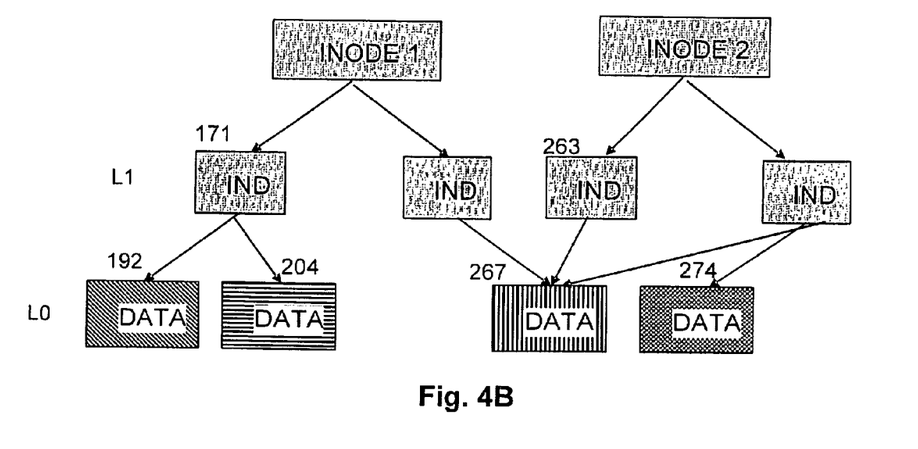

Now consider the process of deduplication. FIGS. 4A and 4B show an example of the buffer trees of two files, where FIG. 4A shows the two buffer trees before deduplication and FIG. 4B shows the two buffer trees after deduplication. The root blocks of the two files are Inode 1 and Inode 2, respectively. The three-digit numerals in FIGS. 4A and 4B are the values of the pointers to the various blocks and, in effect, therefore, are the identifiers of the data blocks. The fill patterns of the direct (L0) blocks in FIGS. 4A and 4B indicate the data content of those blocks, such that blocks shown with identical fill patterns are identical. It can be seen from FIG. 4A, therefore, that data blocks 294, 267 and 285 are identical.

The result of deduplication is that these three data blocks are, in effect, coalesced into a single data block, identified by pointer 267, which is now shared by the indirect blocks that previously pointed to data block 294 and data block 285. Further, it can be seen that data block 267 is now shared by both files. In a more complicated example, data blocks can be coalesced so as to be shared between volumes or other types of logical containers. Note that this coalescing operation involves modifying the indirect blocks that pointed to data blocks 294 and 285, and so forth, up to the root node. In a write out-of-place file system, that involves writing those modified blocks to new locations on disk.

To identify duplicate data blocks, a hash function, such as MD5, SHA-1, SHA-256 or SHA-512, can be applied to all used (unfree) data blocks in the data set to be deduplicated. The output of the hash function is a value for each data block, called a fingerprint, where identical data blocks will always have the same fingerprint. By comparing the fingerprints during a subsequent deduplication process, duplicate data blocks can be identified and coalesced. Data blocks with identical fingerprints are possible duplicates. Once possible duplicates are identified from their fingerprints, a byte-by-byte comparison of those possible duplicates can be done to determine whether they are in fact duplicates of each other. Because the fingerprint of a block is much smaller than the data block itself, fingerprints for a very large number of data blocks can be stored without consuming a significant portion of the storage capacity in the system.

Figure 5:
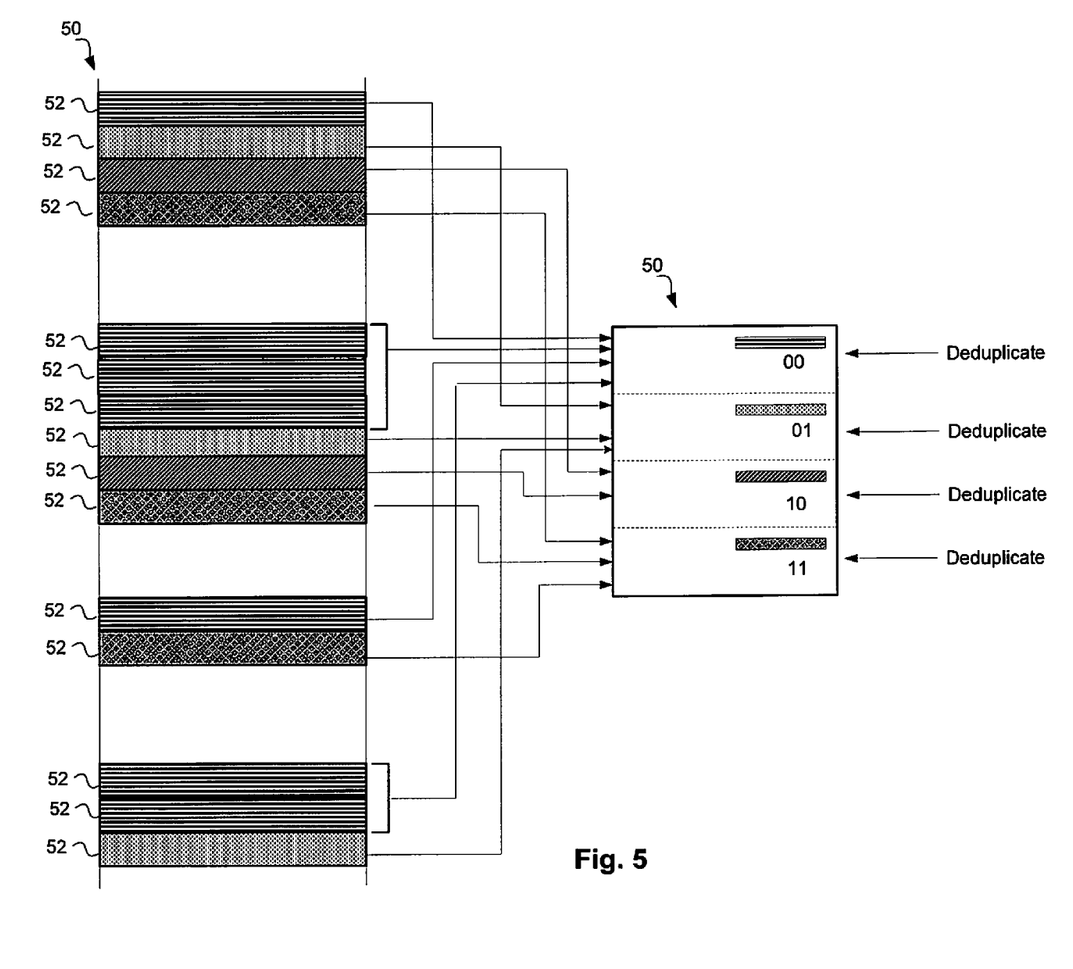
FIG. 5 conceptually illustrates an example of partitioning of a volume that includes a number of data blocks.

Further, in accordance with the technique introduced here, the fingerprints of data blocks in a volume can also be used as a basis to partition the volume, to facilitate scalable deduplication. This technique is described further now with reference to FIG. 5. FIG. 5 shows an example of a logical partitioning of a volume 50 that includes a number of data blocks 52. The volume 50 in the illustrated example is divided into four logical partitions, designated as partitions "00", "01", "10" and "11" (or equivalently, partitions 1, 2, 3 and 4). The partitioning of the volume 50 is illustrated by the different fill patterns of the various blocks 52. A predetermined portion of each data block's fingerprint, called the "tag" (which can be the N MSBs of the fingerprint, for example), is used to identify the partition to which the fingerprint and its corresponding data block will be assigned. Blocks that have the same fill pattern in FIG. 5 have the same fingerprint tag and are therefore all assigned to the same partition of the volume (although they are not necessarily duplicates of each other). If there are two instances of a data block, then both data blocks will have the same fingerprint (and, hence, the same fingerprint tag) and will therefore go to the same volume partition (although not all blocks in a given volume partition will necessarily be duplicates of each other). Thus, data blocks are assigned to partitions based on their content (since a fingerprint is based on the block's content), as opposed to their addresses, for example. Each data block is assigned to the volume partition that has a partition identifier which matches the tag of the fingerprint of that data block. Deduplication processing can therefore be localized within individual partitions.

Figure 6:
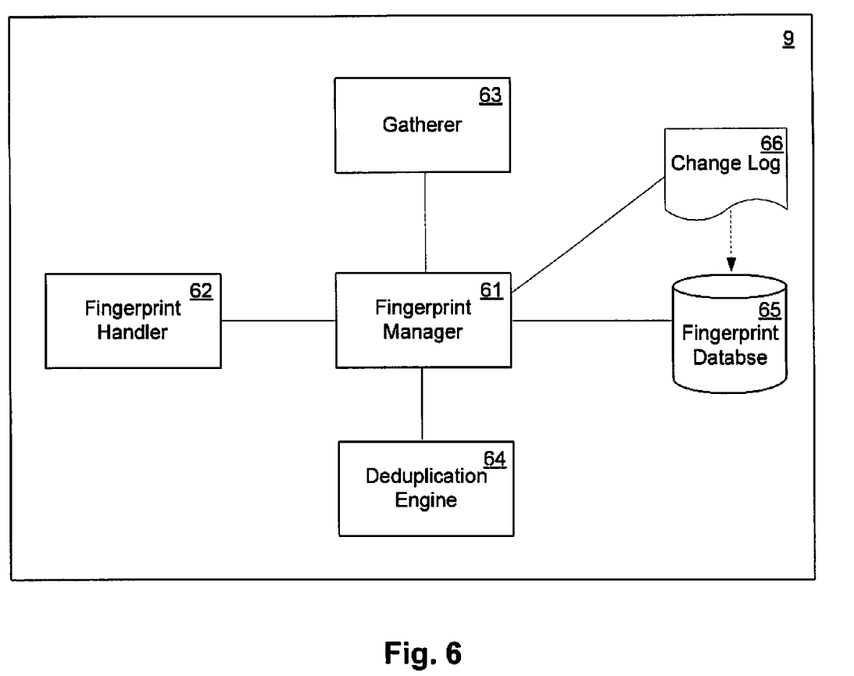
FIG. 6 illustrates elements of the deduplication subsystem.

FIG. 6 illustrates the structure of the deduplication subsystem 9 (FIG. 1), according to at least one embodiment. As shown, the deduplication subsystem 9 includes a fingerprint manager 61, a fingerprint handler 62, a gatherer 63, a deduplication engine 64 and a fingerprint database 65. The fingerprint generator 62 uses a hash algorithm (e.g., MD5, SHA-1, SHA-256, SHA-512) to generate a fingerprint (hash value) of each data block in a given volume. This functionality may be invoked whenever a data block is initially written or modified, in response to a signal from a file system layer of the storage operating system 7. Alternatively, fingerprints of data blocks can be generated in response to some other predefined event or at scheduled times or time intervals.

The gatherer 63 identifies new and changed data blocks and sends them to the fingerprint manager 61. The specific manner in which the gatherer identifies new and changed data blocks is not germane to the technique being introduced here.

The fingerprint manager 61 invokes the fingerprint handler 62 to compute fingerprints of new and changed data blocks and stores the generated fingerprints in a file 66, called the change log 66. Each entry in the change log 66 includes the fingerprint of a data block and metadata for locating the data block. The change log 66 may be stored in any convenient location or locations within or accessible to the storage controller 2, such as in the storage subsystem 4. Like the fingerprint database 65, the change log 66 is also partitioned in a manner which represents the logical partitioning of the volume itself. The fingerprint manager 61 assigns each fingerprint to an appropriate partition of the change log 66 and assigns the corresponding data block to a corresponding volume partition, based on the fingerprint's tag. Blocks that have the same fingerprint tag are assigned to the same change log partition and to the same volume partition (although they are not necessarily duplicates of each other).

When deduplication is performed, the fingerprint manager 61 compares fingerprints within the change log 66 and compares fingerprints between the change log 66 and the fingerprint database 65, to detect possible duplicate data blocks based on those fingerprints. These comparisons are performed only within particular partitions of the change log 66 (i.e., not across partitions), or between corresponding partitions of the change log 66 and the fingerprint database 65. The fingerprint database 65 may be stored in any convenient location or locations within or accessible to the storage controller 2, such as in the storage subsystem 4.

The fingerprint manager 61 identifies any such possible duplicate data blocks to the deduplication engine 64, which then identifies any actual duplicates by performing byte-by-byte comparisons of the possible duplicate data blocks, and coalesces data blocks determined to be actual duplicates.

After deduplication is complete, the fingerprint manager 65 copies to the appropriate partitions of the fingerprint database 65, all fingerprint entries from the change log 66 that belong to blocks which survived the coalescing operation. The fingerprint manager 65 then deletes the change log 66.

Figure 7:
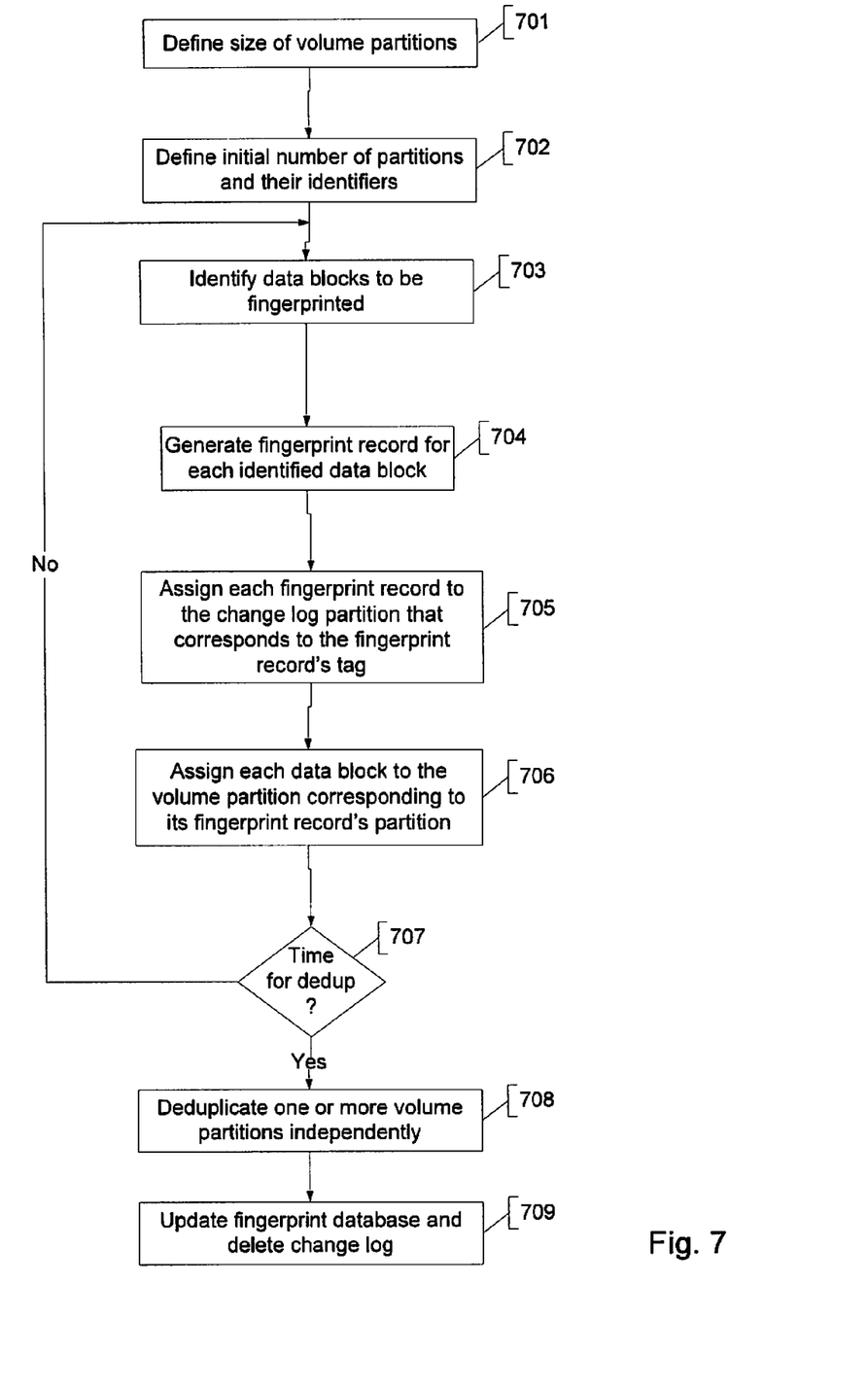
FIG. 7 is a flow diagram showing an example of a process for assigning fingerprints and data blocks to partitions.

FIG. 7 shows an example of a process for assigning fingerprints and data blocks to partitions according to the technique introduced here. Initially, at 701 the process defines the size of the logical partitions of a volume. This operation can be in response to user input specifying the partition size (based on, for example, expected memory requirements for deduplication, as explained above), or it can be an automatic operation that defines the partition size (e.g., based on heuristics). Next, at 702 the process defines the initial number of logical partitions for the volume and their identifiers. The number of partitions can be computed simply as the volume size divided by the partition size, rounded up to the next whole number which is a power of two.

At 703 the process identifies all data blocks in the volume that are to be fingerprinted. The first time this process is executed on a volume, this operation identifies all used data blocks in the volume; in subsequent iterations, it identifies only data blocks that have been modified since the last iteration. At 704 the process then generates a fingerprint record (including fingerprint value and other metadata such as mentioned above) of each data block that was identified at 703.

At 705 the process assigns each fingerprint record to whichever partition of the change log 66 corresponds to the fingerprint record's tag (e.g., the N MSBs of the fingerprint). For example, assume that there are four logical partitions defined for a given volume, identified as partitions 00, 01, 10 and 11. Accordingly, each fingerprint record would be assigned to the change log partition whose identifier matches the tag of that fingerprint record. Likewise, for each change log partition, a corresponding volume logical partition is defined with the same identifier.

Therefore, at 706 the process assigns each data block identified at 703 to the volume logical partition which corresponds to its fingerprint record's partition. After 706, if it is determined at 707 that it is not yet time for deduplication, the process loops back to 703 (described above). When it is time for deduplication, deduplication is performed at 708 on one or more of the volume partitions, independently for each partition. As mentioned above, duplicates are detected by using both the change log 66 and the fingerprint database 65 to identify possible duplicate data blocks, with byte by byte comparisons then being done on the possible duplicate data blocks to identify actual duplicates. Deduplication can be performed at any convenient time, such as during period of low system usage. For example, deduplication can be scheduled, or it can be performed as a background process during idle processor cycles. Note that the processing order in which different partitions are deduplicated can be selected to amortize the run time of deduplication. After deduplication is complete, at 709 the fingerprint database 65 is updated based on the change log 66 as described above, and the change log is then deleted.

Thus, a method and apparatus for scalable deduplication have been described. The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of scalable deduplication, the method comprising:
   identifying a plurality of data blocks in a set of data to be deduplicated;
   generating a fingerprint of each of the plurality of data blocks, the fingerprints for use in detecting duplicate data blocks;
   defining the set of data to be duplicated as containing a plurality of logical partitions;
   assigning each of the plurality of data blocks to exactly one of the logical partitions, including ensuring that data blocks that are duplicates of each other are assigned to the same logical partition by using a portion of the fingerprint of each of the data blocks to determine the logical partition to which the data block should be assigned; and
   deduplicating data blocks independently in each of the plurality of logical partitions.

2. A method as recited in claim 1, wherein said deduplicating comprises using the fingerprints of the plurality of data blocks to detect possible duplicate data blocks.

3. A method as recited in claim 1, wherein using a portion of the fingerprint of each of the data blocks to determine the logical partition to which the data block should be assigned comprises assigning each said data block to the logical partition that has a partition identifier which matches a predefined portion of the fingerprint of the data block.

4. A method as recited in claim 3, wherein each said fingerprint includes a plurality of bits, and wherein the predefined portion of the fingerprint is a predetermined number of most significant bits of the fingerprint.

5. A method as recited in claim 3, wherein each said fingerprint includes a plurality of bits, and wherein the predefined portion of the fingerprint is a predetermined number of least significant bits of the fingerprint.

6. A method as recited in claim 3, wherein each said fingerprint includes a plurality of bits, and wherein the predefined portion of the fingerprint is a predetermined number of bits excluding the most significant bit and the least significant bit of the fingerprint.

7. A method of scalable deduplication, the method comprising:
   identifying a plurality of data blocks in a set of data to be deduplicated in a network storage system;
   using a hash algorithm to generate a fingerprint of each of the plurality of data blocks, each said fingerprint including a plurality of bits;
   storing the fingerprints of the data blocks in a log, including defining the log to include a first plurality of partitions, assigning each of the first plurality of partitions an identifier, and assigning each fingerprint to exactly one of the first plurality of partitions by assigning each fingerprint to the partition that has an identifier which matches a predefined subset of the plurality of bits of the fingerprint;
   defining the set of data to be duplicated as including a plurality of logical partitions, each of the plurality of logical partitions corresponding to a different one of the first plurality of partitions;
   associating each of the plurality of data blocks with exactly one of the plurality of logical partitions, including ensuring that data blocks that are duplicates of each other are assigned to the same logical partition, by assigning each of the data blocks to the one of the plurality of logical partitions which corresponds to the one of the first plurality of partitions that contains the fingerprint of the data block; and
   deduplicating data blocks independently in each of the plurality of logical partitions, including using the fingerprints of the plurality of data blocks to detect possible duplicate data blocks.

8. A method as recited in claim 7, wherein the predefined subset of the fingerprint is a predetermined number of most significant bits of the fingerprint.

9. A method as recited in claim 7, wherein the predefined subset of the fingerprint is a predetermined number of least significant bits of the fingerprint.

10. A method as recited in claim 7, wherein the predefined subset of the fingerprint is a predetermined number of bits excluding the most significant bit and the least significant bit of the fingerprint.

11. A network storage system comprising
   a processor;
   a network interface through which to communicate with a remote host via a communication link;
   a persistent storage subsystem to store a set of data; and
   a memory storing code which, when executed by the processor, causes the network storage system to perform a process that comprises:
      identifying a plurality of data blocks in the set of data;
      generating a fingerprint of each of the plurality of data blocks;
      defining the set of data as containing a plurality of logical partitions;
      assigning each of the plurality of data blocks to exactly one of the logical partitions, including ensuring that data blocks that are duplicates of each other are assigned to the same logical partition by using a portion of the fingerprint of each of the data blocks to determine the logical partition to which the data block should be assigned; and
      deduplicating data blocks independently in each of the plurality of logical partitions, including using the fingerprints of the plurality of data blocks to detect possible duplicate data blocks.

12. A network storage system as recited in claim 11, wherein using a portion of the fingerprint of each of the data blocks to determine the logical partition to which the data block should be assigned comprises assigning each said data block to the logical partition that has a partition identifier which matches a predefined portion of the fingerprint of the data block.

13. A network storage system as recited in claim 12, wherein each said fingerprint includes a plurality of bits, and wherein the predefined portion of the fingerprint is a predetermined number of most significant bits of the fingerprint.

14. A network storage system as recited in claim 11, wherein each said fingerprint includes a plurality of bits, and wherein the predefined portion of the fingerprint is a predetermined number of least significant bits of the fingerprint.

15. A network storage system as recited in claim 11, wherein each said fingerprint includes a plurality of bits, and wherein the predefined portion of the fingerprint is a predetermined number of bits excluding the most significant bit and the least significant bit of the fingerprint.

16. A system comprising:
   a storage operating system to manage data access operations directed to data stored in a persistent storage facility by a remote host; and,
   a deduplication subsystem, the deduplication subsystem including
      a gatherer to identify data blocks that have been modified, of the data;
      a fingerprint generator to generate a fingerprint of each of the data blocks;
      a fingerprint manager to store each of the fingerprints in a log; to define the log to include a first plurality of partitions; to assign each of the first plurality of partitions an identifier; and to assign each fingerprint to exactly one of the first plurality of partitions by assigning each fingerprint to the partition that has an identifier which matches a predefined subset of the plurality of bits of the fingerprint; and
      a deduplication engine to define the data to include a plurality of logical partitions, each of the plurality of logical partitions corresponding to a different one of the first plurality of partitions; to associate each of the plurality of data blocks with exactly one of the plurality of logical partitions, including ensuring that data blocks that are duplicates of each other are assigned to the same logical partition, by assigning each of the data blocks to the one of the plurality of logical partitions which corresponds to the one of the first plurality of partitions that contains the fingerprint of the data block; and to deduplicate data blocks of the data independently in each of the plurality of logical partitions.

17. A system as recited in claim 16, wherein the deduplication engine uses the fingerprints of the plurality of data blocks to detect duplicate data blocks.

18. A system as recited in claim 16, wherein the predefined subset of the fingerprint is a predetermined number of most significant bits of the fingerprint.

19. A system as recited in claim 16, wherein the predefined subset of the fingerprint is a predetermined number of at least significant bits of the fingerprint.

20. A system as recited in claim 16, wherein the predefined subset of the fingerprint is a predetermined number of bits excludng the most significant bit and the least significant bit of the fingerprint.

* * * * *